Figure 9:
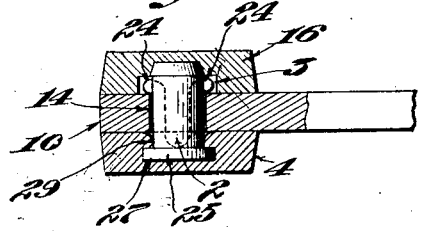

Oct. 16, 1928.
F. A. STEVENS
1,687,954
OPHTHALMIC MOUNTING
Original Filed May 8, 1920   2 Sheets-Sheet 1
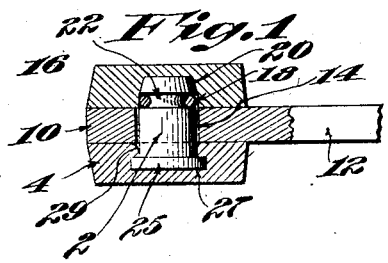
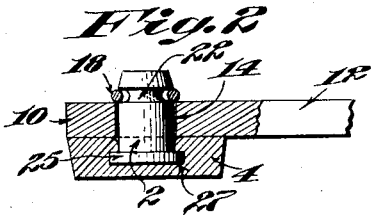
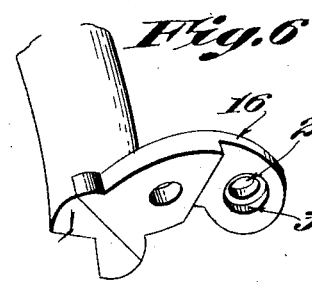
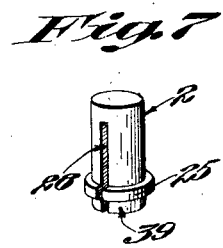
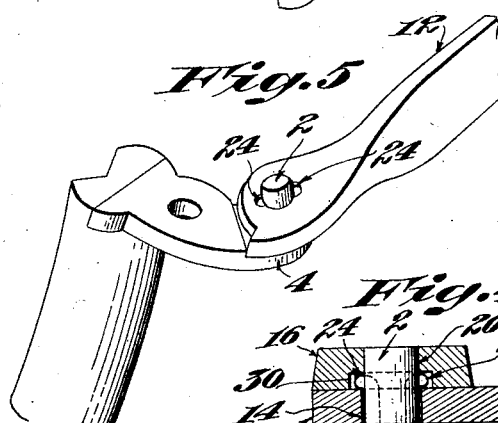
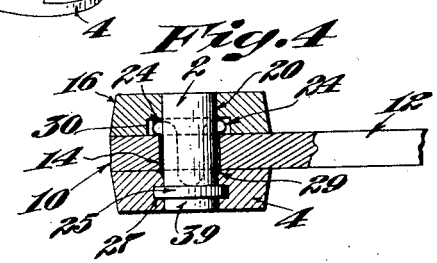
Inventor
Frederick A. Stevens
by David Rines
Attorney Oct. 16, 1928.

F. A. STEVENS

OPHTHALMIC MOUNTING

Original Filed May 8, 1920   2 Sheets-Sheet 2

1,687,954

Inventor
Frederick A. Stevens
by David Rines
Attorney

Patented Oct. 16, 1928.

1,687,954

UNITED STATES PATENT OFFICE.

FREDERICK ARTHUR STEVENS, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Original application filed May 8, 1920, Serial No. 379,788. Divided and this application filed April 24, 1924. Serial No. 708,695.

The present invention relates to ophthalmic mountings and more particularly to temple connections for spectacles. The present application is a division of an application, Serial No. 379,788, filed May 8, 1920, which matured on December 30, 1924, into Patent No. 1,521,484.

The securing together of the temple end pieces of a pair of spectacles is a delicate operation which requires skillful manipulation. The ends of the rim must be held, one in each hand, and the lens must be prevented from falling out of the open rim, and yet some way must also be found for holding the temple in position about the dowel until the end pieces are brought together and the free end of the dowel has entered its registering opening provided upon the opposite end piece. In many instances, the temple falls off the dowel before the operation is completed, necessitating a repositioning of the various elements anew preparatory to another trial. Various attempts have hitherto been made to overcome this difficulty, most of which involve complications of structure, and none of which are entirely satisfactory.

The object of this invention, therefore, is to provide simple means for self-maintenance of the temple in position upon the dowel until the end pieces are secured together.

To this end, a feature of the invention contemplates providing the dowel with a yielding projecting shoulder that is adapted to be engaged by the temple to maintain it in position upon the dowel. The shoulder may yield to permit it to pass through the opening in the ear of the temple to permit removal of the temple from the dowel.

As commonly constructed, the dowels provided upon temple end pieces are so insecurely mounted thereon that a comparatively small force exerted upon their free ends is sufficient to drive them through their supporting end pieces. It has been suggested to form the dowel integral with the end piece, but this introduces difficulties in manufacture that have caused the suggestion to meet with disfavor. The expedient has also been tried of forming the dowel with a reduced terminal portion which extends through the reduced opening of a countersunk bore in the end piece, and hammering or riveting over so much of the reduced terminal portion as extends through and beyond the reduced opening, thus securing the dowel firmly in position upon the end piece. Among other objections to this construction, the body portion of the dowel is necessarily much too large for ordinary purposes and the hammering or riveting over of the terminal portion of the dowel introduces an unattractive appearance which repels purchasers. In order to avoid the objectionable riveting, the use of suitably fashioned loose dowels has been proposed, but loose members of the size of temple dowels become so easily lost or misplaced that this proposal, too, has not met with commercial favor.

A further object of the present invention is to improve upon the construction of end pieces, eliminating the above-mentioned difficulties.

With this end in view, a feature of the invention resides in providing a slender dowel with an enlarged head that seats upon the shoulder of a counterbore in the end piece, and swaging the material near the walls of the bore over against the head and the body of the dowel to secure the dowel in place.

The ends of the dowel are commonly visible through the outer faces of the end pieces, producing an unsightly appearance which it has been proposed to eliminate by making the dowel integral with the end piece. For the reason above given, this proposal is not practical.

A further object of the present invention is to provide an end-piece construction the separately formed dowel of which shall not be visible when the end pieces are secured together in place.

To the attainment of this result, a feature of the invention contemplates boring the end pieces but part way through for the reception of the dowel, the outer faces of the end pieces remaining thus unmarred by the boring tool.

With the above and other objects in view, the invention consists of the improved ophthalmic mounting hereinafter described, illustrated in the accompanying drawings and defined in the appended claims.

Figure 10:
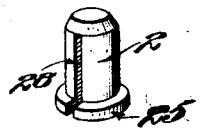
Figure 11:
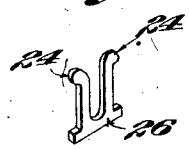
Figure 12:
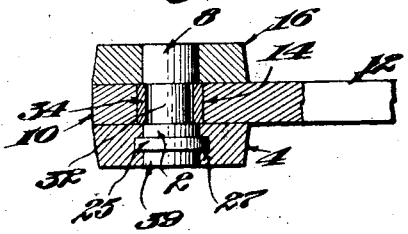
Figure 14:
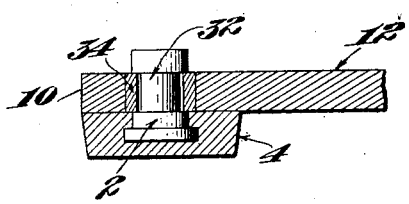
Figure 13:
Figure 15:
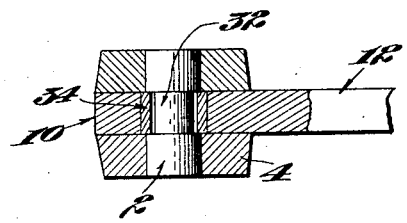
Figure 16:
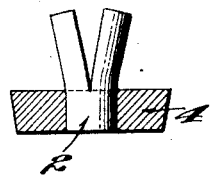

In the drawings, Fig. 1 is a view in cross section through the end pieces of a spectacle frame, showing a preferred embodiment of the present invention; Fig. 2 is a similar view, with one of the end pieces removed, showing a temple maintained in position upon a dowel; Fig. 3 is a view of a detail; Fig. 4 is view similar to Fig. 1 of a modification; Fig. 5 is a perspective view of the modification shown in Fig. 4, showing a temple maintained in position upon the dowel; Fig. 6 is a perspective view showing the construction of the end piece that is unprovided with the dowel; Figs. 7 and 8 are views of details; Fig. 9 is a view similar to Fig. 4 of a slight modification; Figs. 10 and 11 are views corresponding to Figs. 7 and 8, respectively; Fig. 12 is a view of still another modification; Fig. 13 is a view of a detail; Fig. 14 is a view corresponding to Fig. 2 of a slightly modified embodiment; Fig. 15 is a view similar to Fig. 12, illustrating a somewhat different method of mounting the dowel upon the end piece; and Fig. 16 is a view of still another modification.

Referring to Figs. 1, 2 and 3, the body portion of a dowel 2, that is permanently secured upon a temple end piece 4 of a spectacle frame, is cylindrical to provide a bearing for a temple 12, and is shown provided with a projecting, ring-shaped shoulder 18 near the free end. The ear 10 of the temple 12 is provided with the usual opening 14 to facilitate its mounting upon the dowel. The ring-shaped projection 18 is shown separable from the body portion of the dowel. For convenience of mounting within the dowel-receiving opening 20 of an ordinary standard end piece 16, the ring-shaped projection 18 is constituted of spring metal expansible, as shown in Figs. 2 and 3, to retain the temple in position upon the dowel, and contractible, as shown in Fig. 1, so as to be enclosed within the dowel-receiving opening 20 of standard size. To permit of this contraction, and so that the ring may be prevented from falling off the dowel, it is shown mounted within a groove 22 provided near the free end of the dowel.

The temple is perfectly free to pivot about the dowel, without frictional binding thereagainst. It may readily be removed from the dowel by removing the ring 18 or by compressing the ring within the groove 22, but can not fall off accidentally, though the spectacles be held in any desired position. This construction provides very little opportunity for wabbling of the temple upon the dowel.

The shoulder 18 of Fig. 1 need not extend all the way around the dowel. This will be understood from a consideration of Fig. 4, in which the shoulder is shown as consisting of a short, projecting finger 24. It is preferred to have this finger constituted of spring metal mounted upon a spring-metal base 26, as is illustrated in Fig. 8. The base 26 is mounted in a longitudinal slot 28 of the dowel. The illustrated embodiment of this modification is shown as comprising two oppositely disposed spring fingers 24, so that the temple ear may be engaged by one or the other of the fingers. In practice, to prevent wabbly motion, as in the case of Fig. 2, both fingers may be always in engagement with the temple ear, as will be clear from Figs. 4 and 5. The fingers 24 may be pressed inwardly into the slot 28 if an end piece 16 of standard construction is employed or, preferably, the opening 20 of the end piece 16 may be slightly enlarged at 30 to provide for receiving the projecting fingers without compressing them inwardly.

The structure of this modification is a little more complicated than that of Fig. 1, but, on the other hand, it has all the advantages of the latter-named modification with the additional advantage that the temple may be engaged at two points only by the fingers 24 and not throughout a complete circumference, as is the case with the ring 18.

In the modification of Fig. 12, the lack of wabbly motion of the temple upon the dowel that is attendant upon the structures of Figs. 1 and 4 is obtained with an integral projecting ring 8 upon the dowel. The body portion of the dowel is intermediately reduced in cross section at 32 and a spring collar 34 is loosely mounted about the reduced portion. The integral, projecting, ring-shaped shoulder 8 prevents the collar becoming detached from the dowel. After the spring collar 34 has been thus positioned, it is contracted and introduced within the opening 14 of the temple ear. The walls of the opening 14 becoming frictionally engaged by the collar, the collar and the temple act functionally as a unit. The temple is thus prevented from falling off the dowel, though, as in the other described modifications, the spectacles may be held in any position, yet it is freely pivotally mounted thereover without frictional binding thereagainst and it may be readily removed and replaced as occasion demands.

A very simple structure, as is illustrated in Fig. 16, may be obtained by simply slitting longitudinally the free end of the dowel and springing the free slitted portions apart. The slitted sprung apart portions constitute shoulders similar to the spring fingers 24 of Fig. 4, but they have the disadvantage that they would cause binding upon the walls of the slot 14, and thereby interfere with proper pivotal movement of the temple.

Dowels, as ordinarily constructed, are comparatively easily forced through the outer faces of the end pieces to which they are secured by comparatively light thrusts acting longitudinally upon the ends of the dowels.

This difficulty is overcome, according to one feature of the present invention, by forming an enlarged head or shoulder 25 upon the dowel, the body portion remaining, however, slender.

The enlarged head 25 seats upon the shoulder 27 of a countersunk bore 29 (see Figs. 4 and 12) formed in the end piece 4, the larger diameter of the bore being equal to the diameter of the enlarged head. The material near the wall of the bore is then forced into contact with the head and that portion of the body of the dowel that is mounted in the bore in any desired way, as by swaging, thus securing the dowel firmly in place.

A very efficient, simple and inexpensive end piece is thus provided, having all the advantages of the prior-art structures and the added advantage that the dowel can not become accidentally dislodged from its setting by a comparatively light thrust upon the end face of the dowel. This structure is, however, of further advantage in that, with slight modification, it lends itself readily to the manufacture of a temple connection the dowel of which is invisible when the parts of the spectacle are assembled.

This feature of the invention will be readily understood from a consideration of Figs. 1, 9 and 14. The bore 29 does not extend all the way through the end piece 4, and the terminal portion 39 is omitted from the dowel, so that the dowel, when secured in position, is not visible from the outer face of the end piece. The enlarged head 25 particularly adapts the dowel for a mounting of this character. The opening 20 in the other end piece is similarly bored but part way through and the dowel is correspondingly shortened. When the end pieces are secured together, with the temple in place between them, as shown in Fig. 1, no sign of the dowel is anywhere visible, the outer faces of the end pieces being thus rendered smooth and attractive. The elimination of the customary rings from the outer faces of the end pieces furthermore provides one less dirt-collecting agency upon the temple mounting.

As the invention is believed to be broad in scope, it is intended that the following claims shall be broadly construed except in so far as limitations may therein be specifically imposed.

What is claimed is:

1. A temple end piece having a dowel adapted to be received in the opening of a temple ear when the ear is positioned over the dowel with one face thereof in contact with the end piece, and a yielding shoulder projecting from the dowel adapted to be engaged by the ear to maintain the temple in position upon the dowel, the shoulder being adapted to yield to permit removal of the temple from the dowel.

2. A temple end piece having a dowel adapted to be received in the opening of a temple ear when the ear is positioned over the dowel with one face thereof in contact with the end piece, and a spring collar projecting from the dowel and adapted to be engaged by the ear to maintain the temple in position upon the dowel, the spring collar being adapted to yield to permit removal of the temple from the dowel.

3. In combination, a temple end piece having a dowel, and a temple having an ear provided with an opening within which the dowel is received, the ear being adapted to be positioned over the dowel with one face thereof in contact with the end piece, the body portion of the dowel being cylindrical to provide a bearing for the temple, the free end of the cylindrical dowel being intermediately reduced in cross section, a yielding ring mounted on the reduced portion of the dowel, adjacent to the other face of the ear and adapted to be engaged by the ear to maintain the temple in position upon the dowel, the ring being adapted to yield to permit it to be passed through the opening to permit removal of the temple from the dowel.

4. A temple end piece having a bore extending from one face of the end piece part way to the opposite face, and a slender dowel having an enlarged head in the bore, the material near the wall of the bore being disposed in contact with the head and the body of the dowel.

5. A temple end piece having a countersunk bore and a slender dowel having an enlarged head and a portion of its body in the enlarged portion of the bore and a portion seated in the remaining portion of the bore, the material near the wall of the bore being disposed in contact with the head and the body of the dowel.

6. An opthalmic mounting having, in combination, two end pieces each provided with an opening extending from a face thereof part way into the end piece, a post secured in one of the openings and extending into the other opening, and a temple mounted over the post.

7. In combination, a temple end piece having a dowel, a temple having an ear provided with an opening within which the dowel is received, the ear being adapted to be positioned over the dowel with one face thereof in contact with the end piece, and a yielding shoulder projecting from the dowel adjacent to the other face of the ear and adapted to be engaged by the ear to maintain the temple in position upon the dowel, the shoulder being adapted to yield to permit it to be passed through the opening to permit removal of the temple from the dowel.

8. In combination, a temple end piece having a dowel, a temple having an ear provided with an opening within which the dowel is received, the ear being adapted to be positioned over the dowel with one face thereof in contact with the end piece, and a yielding ring projecting from the dowel adjacent to the other face of the ear and adapted to be engaged by the ear to maintain the temple in position upon the dowel, the ring being adapted to yield to permit it to be passed through the opening to permit removal of the temple from the dowel.

9. In combination, a temple end piece having a dowel, a temple having an ear provided with an opening within which the dowel is received, the ear being adapted to be positioned over the dowel with one face thereof in contact with the end piece, and yielding means adjacent to the other face of the ear when the said one face is in contact with the end piece, and adapted to be engaged by the ear when the said one face is in contact with the end piece to maintain the temple in position upon the dowel, the yielding means being adapted to yield to permit it to be passed through the opening to permit removal of the temple from the dowel.

10. In combination, a temple end piece having a dowel, a temple having an ear provided with an opening within which the dowel is received, the ear being adapted to be positioned over the dowel with one face thereof in contact with the end piece, and spring means projecting from the dowel adjacent to the other face of the ear and adapted to be engaged by the ear to maintain the temple in position upon the dowel, the spring means being adapted to yield to permit it to be passed through the opening to permit removal of the temple from the dowel.

In testimony whereof, I have hereunto subscribed my name this 21 day of April, 1924.

FREDERICK A. STEVENS.